United States Patent
Lasater et al.

(10) Patent No.: US 7,249,096 B1
(45) Date of Patent: Jul. 24, 2007

(54) SYSTEMS AND METHODS FOR FACILITATING A DISTRIBUTION OF BANK ACCOUNTS VIA AN EDUCATIONAL INSTITUTION

(75) Inventors: Miles Lasater, New Haven, CT (US); Sean Glass, New Haven, CT (US); Mark Volchek, East Haven, CT (US); Jeff Wong, Easton, CT (US); Ernest C. Jones, Houston, TX (US); Casey McGuane, East Haven, CT (US); Henry G. Fuldner, Milwaukee, WI (US); Kiril Savino, New York, NY (US)

(73) Assignee: Higher One, Inc., New Haven, CT (US)

( * ) Notice: Subject to any disclaimer, the term of this patent is extended or adjusted under 35 U.S.C. 154(b) by 501 days.

(21) Appl. No.: 10/345,605

(22) Filed: Jan. 16, 2003

Related U.S. Application Data

(60) Provisional application No. 60/350,255, filed on Jan. 17, 2002.

(51) Int. Cl.
*G06Q 40/00* (2006.01)
(52) U.S. Cl. .................................. 705/39; 705/35
(58) Field of Classification Search ................ 705/39, 705/41, 35
See application file for complete search history.

(56) References Cited

U.S. PATENT DOCUMENTS

| | | | |
|---|---|---|---|
| 5,844,230 A | * | 12/1998 | Lalonde ...................... 235/487 |
| 6,092,053 A | * | 7/2000 | Boesch et al. ................ 705/26 |
| 6,839,690 B1 | * | 1/2005 | Foth et al. ................... 705/53 |
| 6,963,857 B1 | * | 11/2005 | Johnson ....................... 705/39 |
| 2001/0027472 A1 | | 10/2001 | Guan |
| 2002/0128962 A1 | | 9/2002 | Kasower |
| 2002/0138356 A1 | * | 9/2002 | Dutta et al. .................. 705/26 |
| 2002/0198806 A1 | | 12/2002 | Blagg et al. |
| 2004/0030657 A1 | | 2/2004 | Holm-Blagg et al. |
| 2005/0097017 A1 | | 5/2005 | Hanratty |

FOREIGN PATENT DOCUMENTS

EP  1 102 224 A2  5/2001

OTHER PUBLICATIONS

"A Nonprofit Association Debuts a "safe" card for Students," author anonymous, Credit Card News, Aug. 15, 2000; Accounting & Tax Periodicals, p. 6. (1 page attached to file).*

(Continued)

*Primary Examiner*—James Kramer
*Assistant Examiner*—Kirsten Sachwitz Apple
(74) *Attorney, Agent, or Firm*—Wiggin and Dana LLP; Gregory S. Rosenblatt

(57) ABSTRACT

According to some embodiments, systems and methods are provided to facilitate a distribution of bank accounts via an educational institution. For example, information associated with a student, faculty member, or alum may be received from a university. A soft bank account may then be established based on the received information. If an indication of acceptance is received (e.g., via a Web site), the soft bank account may be activated. The activated bank account may then be used to process banking transactions.

16 Claims, 21 Drawing Sheets

OTHER PUBLICATIONS

"Colleges Should do Homework on Affinity Cards" American Banker, New York, NY, Dec. 21, 2000, vol. 165, Issue 244, p. 9. (2 pages attached to file).*

"PNC Bank Named Preferred Provider of Financial Services to Pitt Students," PR Newswire, New York, Aug. 24, 2000, p. 1. (3 pages attached to file).*

Yomiuri Shimbun, "DKB hopes to attract student accounts with new cash card", Jan. 7, 1995, The Daily Yomiuri, 1 pg.

Francis, Vivienne, "The new universities of crime: Vivienne Francis investigates the ever-increasing incidences of fraud in the country's highest institutions of learning and finds out why it's a problem not about to stop", Jan. 26, 1995, Ethnic NewsWatch, The Weekly Journal, SLI-ACC-No: 0495WJDZ 119 000063, Section: p. 2, 3pgs.

O'Leary, Chris, "King Snoopers OKs college ID debits; magnetic-stripe school identification cards; Brief Article", Sep. 11, 1995, Supermarket News, Section: vol. 45; No. 37; p. 18; ISSN: 0039-5803.

"PNC Bank to Offer Penn State Students, Faculty ID/ATM Cards", Pittsburgh Post-Gazette (PA), Oct. 22, 2002. 1 pg.

Isidore, Chris, "Banks go to College to Build Their Rolls", Crain's New York Business, 8756789X, Aug. 17, 1998, vol. 14, Issue 33. 2pgs.

* cited by examiner

| ACCOUNT IDENTIFIER 802 | STUDENT NAME 804 | EDUCATIONAL INSTITUTION 806 | ACCOUNT TYPE 808 |
|---|---|---|---|
| A1001 | JANE GREENE | UNIVERSITY OF HOUSTON | SOFT |
| A1002 | JOHN SMITH | UNIVERSITY OF HOUSTON | ACTIVATED |
| A1003 | MARY WEST | YALE | ACTIVATED |

FIG. 8

SYSTEMS AND METHODS FOR FACILITATING A DISTRIBUTION OF BANK ACCOUNTS VIA AN EDUCATIONAL INSTITUTION

CROSS-REFERENCE TO RELATED APPLICATION

The present application claims the benefit of U.S. Provisional Patent Application No. 60/350,255 entitled "Systems and Methods for Facilitating a Distribution of Bank Accounts via an Educational Institution" and filed on Jan. 17, 2002.

SUMMARY OF THE INVENTION

According to some embodiments, a soft bank account may be established for a student of an educational institution. The account may be established, for example, before any indication is received from the student. Moreover, the account may be based on information received from the educational institution. A financial transaction token, such as a student identification card, may be produced and delivered to the student. An indication of acceptance may then be received from the student, and, as a result, a demand deposit bank may be established by activating the soft bank account.

BACKGROUND

The acquisition of customers by a bank or other financial institution can be difficult. For example, banks typically encounter high customer acquisition costs and slow adoption rates by target audiences. In addition, the products and services offered by banks have become commodities (making price an important means of competition).

Many college-age students already have at least some type of financial relationship with their educational institution. For example, a student may pay tuition and/or receive financial aid via the university. Note that the acquisition of college-age students can be especially important for a bank, because a person at this age is often establishing his or her first banking relationship. It can be difficult, however, for a bank to effectively target advertising and other promotional material to college-age students.

One known type of financial relationship between a student and an educational institution is via a campus identification card. For example, a student may store fifty dollars on a campus identification card to be used when making copies in a school library and/or minor purchases from an on-campus or local merchant. The adoption rate for this type of service is often over eighty percent. However, this a stored-value approach is limited in scope. That is, many types of banking services cannot be provided via a stored-value card (e.g., the ability to write checks).

It is also known that an educational institution can create a more complicated campus identification program, often referred to as a "onecard" system, to let a student use a single card as a form of identification, a financial instrument, a room or building key, and a meal ticket. For example, the educational institution might create an on-campus, closed transaction network that includes vending machines, laundry machines, Point Of Sale (POS) terminals, photocopiers, and/or computer printing stations. These various purchase points might be wired to a central server that executes software to process transactions, track balances, and/or control privileges. A student may load money onto his or her account (e.g., by giving money to the school), and the server can then track how the money is spent.

Some programs have combined an off-campus Automated Teller Machine (ATM) card (e.g., associated with a bank account) and an on-campus onecard into a single physical card. However, the bank account and the on-campus stored value accounts remain separate. This "atomic" account approach can create some convenience for students (e.g., because he or she only needs to carry one card), and may even provide some marketing opportunity for the bank, but does not offer full integration and benefits. For example, the card will not act as a signature-based debit card.

Note that online banks may be particularly interested in acquiring college-age students. For example, college-age students are more likely to have experience with, and access to, online services as compared to other people. Thus, college-age students are often the most likely adopters of online banking services.

BRIEF DESCRIPTION OF THE DRAWINGS

FIG. 8 is a tabular representation of a portion of an account database according to an embodiment of the present invention.

DETAILED DESCRIPTION

Embodiments of the present invention are directed to a distribution of "bank accounts" via an educational institution. As used here, the phrase "bank account" may refer to, for example, a demand deposit account (e.g., as opposed to a mere stored-value account) whereby an account balance can be withdrawn by a depositor without prior notice to the bank (e.g. a checking account). The balance can be withdrawn, for example, via check, an ATM device, or by transfers to other accounts using a Personal Computer (PC) or telephone. Other examples of bank accounts include checking accounts, Negotiable Order of Withdrawal (NOW) accounts, money market accounts, savings accounts, asset management accounts, and brokerage accounts.

Moreover, the phrase "educational institution" as used herein may refer to, for example, a university, a college, a technical school, a professional education program, a government training program, or an on-line educational program. Similarly, the phrase "educational institution member" may refer to any person associated with an educational institution, such as a student, an employee (e.g., a faculty member), or an alum of the educational institution.

Account Distribution System

Figure 1:
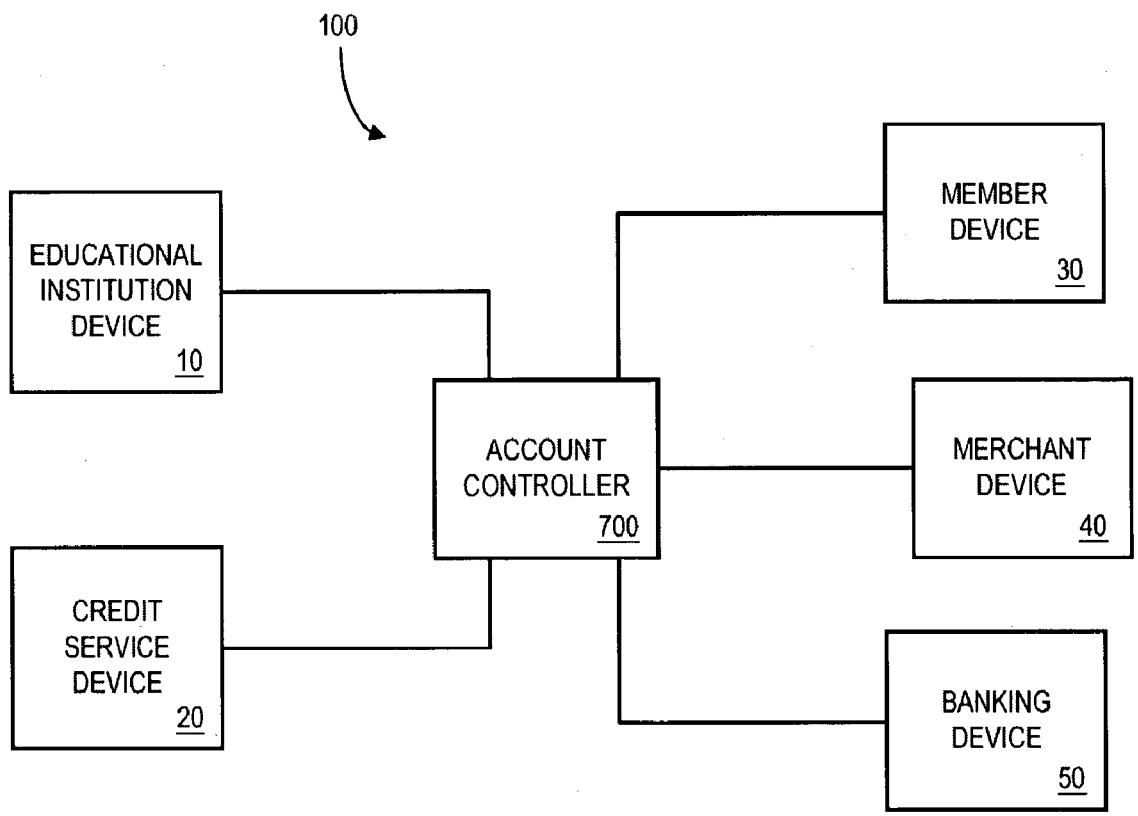
FIG. 1 is a block diagram overview of an account distribution system according to an embodiment of the present invention.

FIG. 1 is a block diagram of an account distribution system 100 according to some embodiments of the present invention. The account distribution system 100 includes an account controller 700 in communication with an educational institution device 10. As used herein, devices (such as the account controller 700 and the educational institution device 10) may communicate via one or more communication networks, such as a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), or an Internet Protocol (IP) network such as the Internet, an intranet or an extranet.

The account controller 700 and educational institution device 10 may be any types of devices capable of performing the functions described herein. The account controller 700 may be associated with, for example, a Web server.

The educational institution device 10 may be associated with, for example, a university's Enterprise Resource Planning (ERP) system. As used herein, the phrase "ERP system" may refer to any of a broad set of activities supported by application software that helps an educational institution manage parts of its business, including software for the financial and human resources aspects of a business. Typically, an ERP system uses (or is integrated with) a relational database system. The educational institution device 10 may store, for example, student information (e.g., a Social Security number, a home address, a school address, financial aid information, and an anticipated date of graduation), staff information (e.g., faculty salary), and registrar information. Note that the educational institution device 10 also be associated with an on-campus (i.e., primarily on-campus) identification card transaction network.

The account controller 700 is also in communication with a credit service device 20, such as one associated with the EQUIFAX® or TRANSUNION® credit reporting systems, and one or more member devices 30. The member devices 30 may comprise, for example, a student's PC or portable computing device, such as a Person Digital Assistant (PDA). Similarly, the account controller 700 is in communication with a merchant device 40, such as a Credit Authorization Terminal (CAT) device, and a banking device 50, such as device associated with an ATM or other banking network.

Although a single account controller 700 is shown in FIG. 1, any number of account controllers 700 may be included in the account distribution system 100. Similarly, any number of educational institution devices 10 (e.g., associated with a number of different universities), or any of the other devices described herein, may be included in the account distribution system 100 according to embodiments of the present invention. Similarly, a single device may act as more than one of the devices illustrated in FIG. 1. For example, a single computer network may serve as both an account controller 700 and a banking device 50.

Note that the devices shown in FIG. 1 need not be in constant communication. For example, the account controller 700 may communicate with the educational institution device 10 on an as-needed or periodic basis.

Methods

Figure 2:
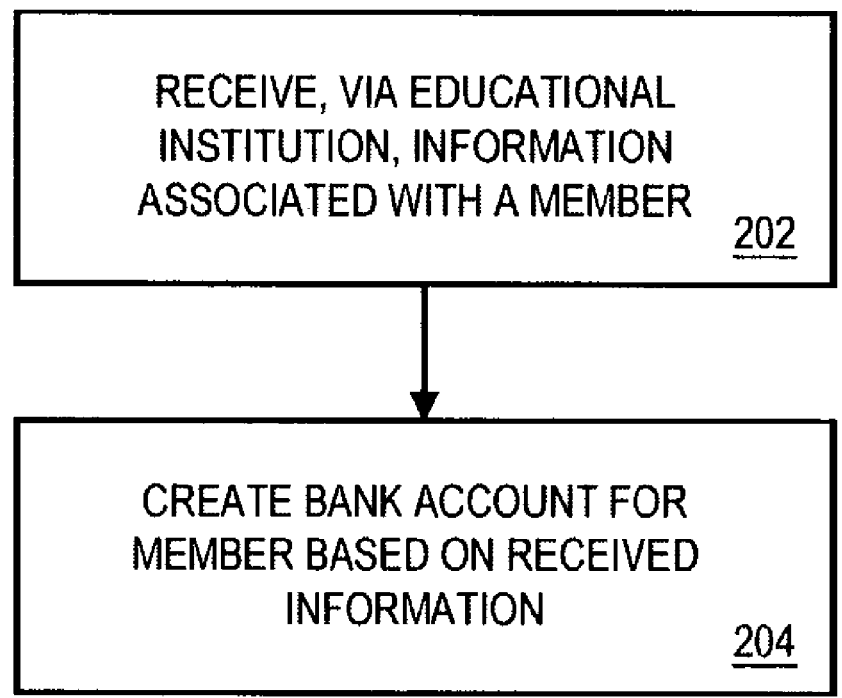
FIGS. 2 through 6 are flow charts of methods according to some embodiments of the present invention.

FIG. 2 is a flow chart of a method according to an embodiment of the present invention. The flow charts in FIG. 2 and the other figures described herein do not imply a fixed order to the steps, and embodiments of the present invention can be practiced in any order that is practicable. The method shown in FIG. 2 may be performed, for example, by the account controller 700.

At 202, information associated with an educational institution member is received via an educational institution. For example, the account controller 700 may receive from an educational institution device 10 a batch of information associated with a number of different students and/or employees. For each member, the received information may include, for example, a Social Security number, a member identification number, a name, a date of birth, a permanent address (e.g., a student's home address), a permanent telephone number, a student/local address (e.g., where the student lives during the school year), a student/local telephone number, a graduation date, a status (e.g., indicating if the student is currently enrolled), a major, an electronic mail address, a drivers license number, a passport number, citizenship information, barcode information (e.g., associated with a bar code on a university identification card), a parent name, a parent address, image information (e.g., a picture of the student), and/or an educational institution identifier.

At 204, a bank account is created for the member based on the received information. For example, the account controller 700 may create demand deposit accounts for students based on the received information. According to one embodiment, the created bank accounts are associated with a university identification card. That is, a single card may act as both: (i) a form of university identification, and (ii) a banking card.

Figure 3:
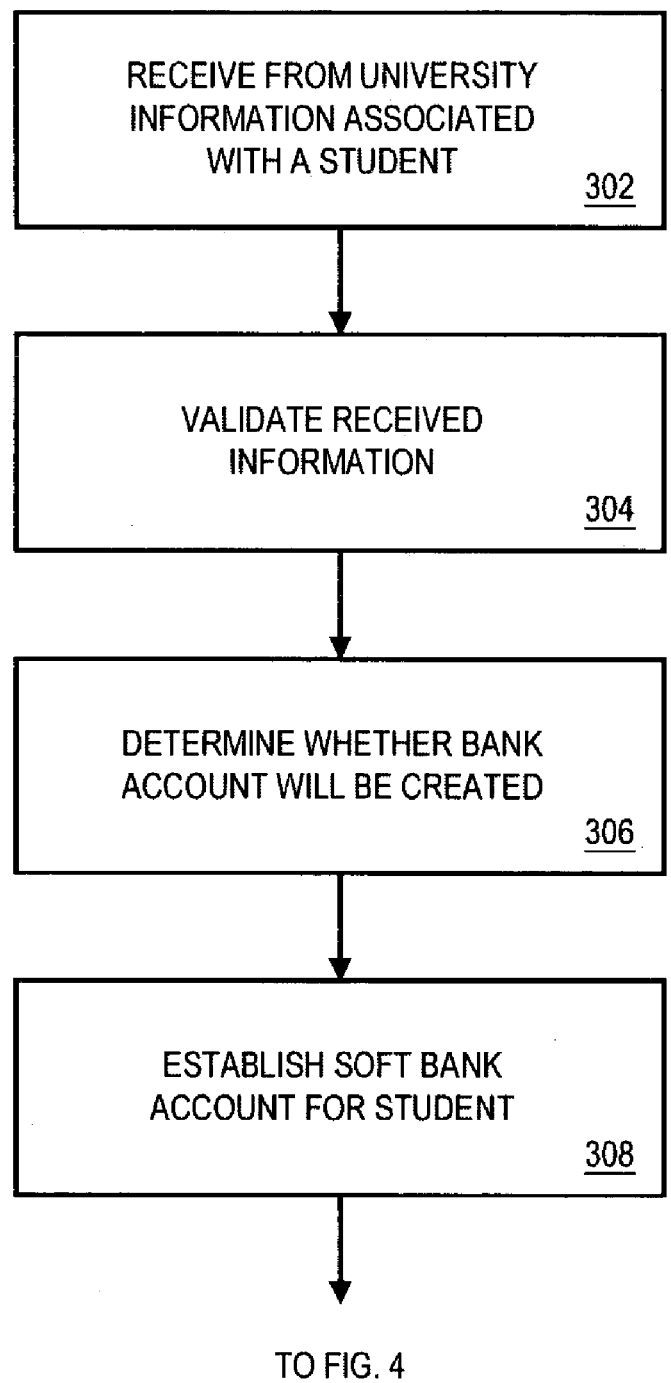
Figure 4:
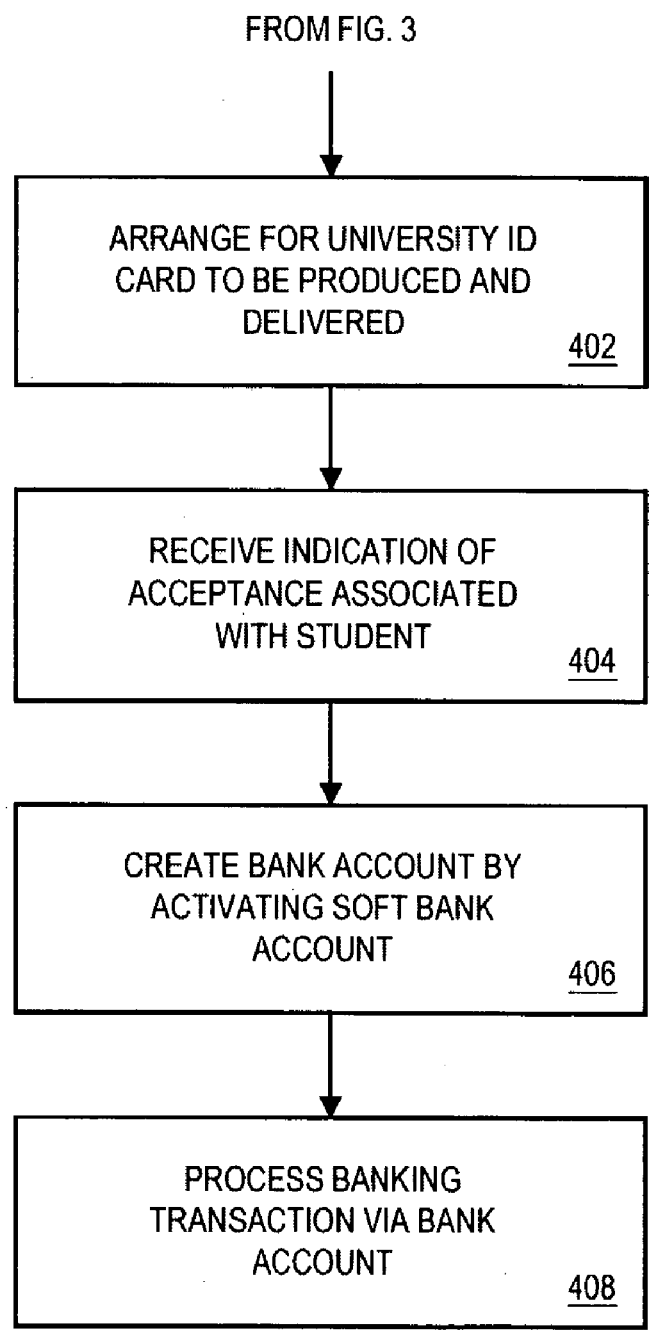

FIGS. 3 and 4 are a flow chart of a method according to another embodiment of the present invention. The method shown in FIGS. 3 and 4 may be performed, for example, by the account controller 700. At 302, information associated with a student is received from the university (e.g., via the educational institution device 10). The received information is then validated at 304. For example, the received information may be reviewed by an operator and/or an automated process.

At 306, it is determined whether or not a bank account will be created based on the received information. For example, the account controller 700 may communicate with the credit service device 20 to determine if an account will be created for a particular student (e.g., based on the student's credit rating).

At 308, a "soft" bank account is established for the student based on the received information. As used herein, establishing a "soft" bank account might mean, for example, that the student does not yet have access to the account. Instead, information may simply be stored to facilitate a subsequent creation (or activation) of an actual bank account for the student (i.e., an actual account that the student can access).

At 402, it is arranged for a university identification card associated with the student to be produced and delivered (e.g., to the educational institution or the student). Note that the card itself may be produced by a third party. According to other embodiments, a different token of identification is produced instead (e.g., such as a unique number or a MOBIL SPEEDPASS® device).

An indication of acceptance associated with the student is then received at 404. For example, the account controller 700 might receive the indication of acceptance via the member device 30 (e.g., the student's PC or telephone). According to one embodiment, the indication of acceptance includes security information (e.g., a code that was provided to the student via postal mail). Note that the indication of acceptance might also be received via the educational institution device 10 or the merchant device 40.

In response to the indication of acceptance, a bank account is created at 406 by activating the soft bank account.

A banking transaction can then be processed for the student via the bank account at 408 (e.g., the student may deposit money into the bank account). According to some embodiments, educational institution transactions are also processed via the bank account. Such transactions might be associated with, for example, tuition, financial assistance, a payroll transaction, a meal plan, textbooks, and/or an on-campus purchase.

Figure 5:
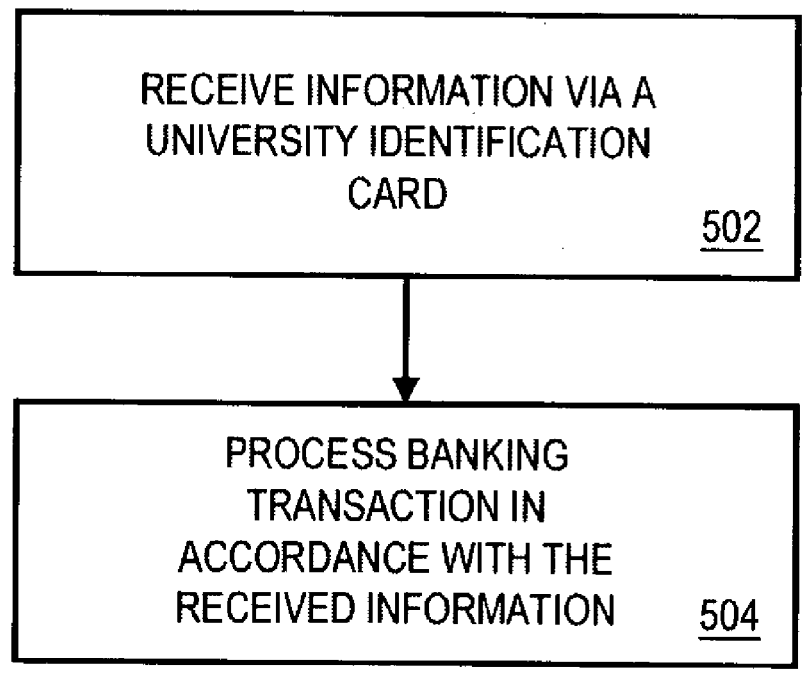

FIG. 5 is a flow chart of a method according to another embodiment of the present invention. The method shown in FIG. 5 may be performed, for example, by the account controller 700, a member device 30, a merchant device 40, and/or a banking device 50. At 502, information is received via a university identification card. For example, a student may present his or her university identification card to a merchant. The merchant may then swipe the card causing an identifier to be transmitted from the merchant device 40 to the account controller 700. The account controller 700 then processes a banking transaction in accordance with the received information at 504.

Figure 6:
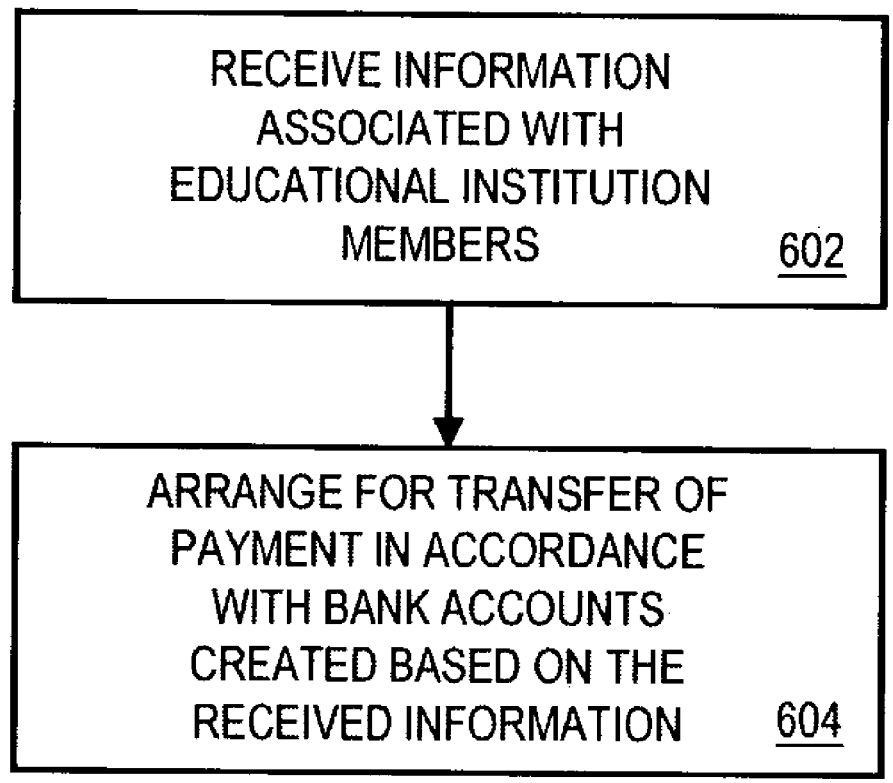

FIG. 6 is a flow chart of a method according to another embodiment of the present invention. The method shown in FIG. 6 may be performed, for example, by the account controller 700. At 602, information associated with a plurality of educational institution members is received from an educational institution. At 604, a transfer of payment with the educational institution is arranged in exchange for at least one of: (i) the received information, (ii) a plurality of bank accounts created in accordance with the received information. For example, the account controller 700 may provide a payment of ten dollars to a university for each bank account that is activated by a student. According to other embodiments the payment is associated with the balance of the bank account and/or transactions processed via the bank account.

Account Controller

Figure 7:
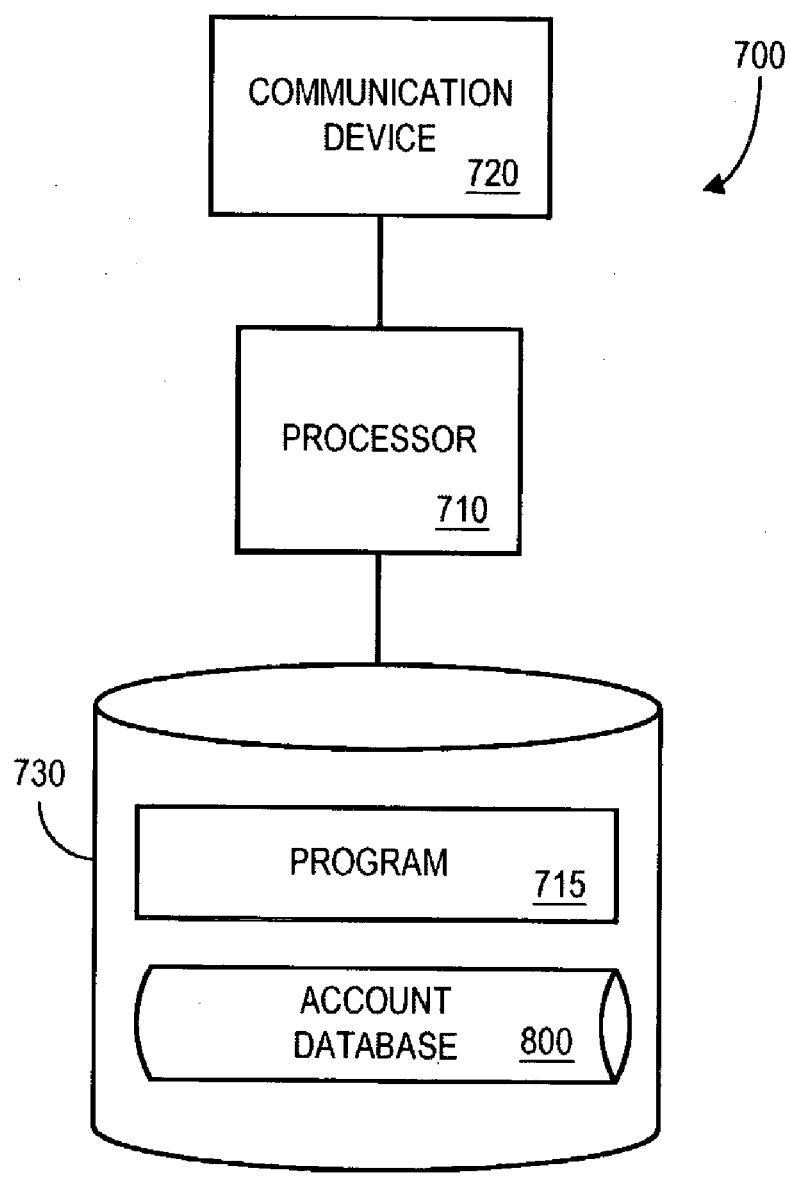
FIG. 7 is a block diagram of an account controller according to an embodiment of the present invention.

FIG. 7 illustrates an account controller 700 that is descriptive of the device shown, for example, in FIG. 1 according to an embodiment of the present invention. The account controller 700 comprises a processor 710, such as one or more INTEL® Pentium® processors, coupled to a communication device 720 configured to communicate via a communication network (not shown in FIG. 7). The communication device 720 may be used to communicate, for example, with educational institution devices 10, credit service devices 20, member devices 30, merchant devices 40, banking devices 50, and/or other account controllers.

The processor 710 is also in communication with a storage device 730. The storage device 730 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 730 stores a program 715 for controlling the processor 710. The processor 710 performs instructions of the program 715, and thereby operates in accordance with the present invention. For example, the processor 710 may receive, via an educational institution device 10, information associated with an educational institution member. The processor 710 may then create a bank account for the member based on the received information.

As used herein, information may be "received" by or "transmitted" to, for example: (i) the account controller 700 from another device; or (ii) a software application or module within the account 700 from another software application, module, or any other source.

The storage device 730 also stores an account database 800 (described with respect to FIG. 8). The illustration and accompanying description of the database presented herein is exemplary, and any number of other database arrangements could be employed besides those suggested by the figure.

Account Database

Referring to FIG. 8, a table represents the account database 800 that may be stored at the account controller 700 according to an embodiment of the present invention. The table includes entries identifying bank accounts. The table also defines an account identifier 802, a student name 804, an educational institution 806, and an account type 808 for each of the entries. Some of the information in the account database 800 may be created and updated, for example, based on information received from an educational institution device 10.

The account identifier 802 may be, for example, an alphanumeric code associated with a particular bank account. The student name 804 indicates the student who is associated with that bank account, and the educational institution 806 represents that student's university. The account type 808 may indicate, for example whether the bank account is "soft" (e.g., the account has not been accepted by the student) or "activated."

In addition to the information illustrated in FIG. 8, other information can also be stored in the account database 800. For example, a Social Security number, address, telephone number, and electronic mail address may be stored. Similarly, a date of birth and anticipated graduation date might be stored in the account database 800.

System Overviews

Figure 9:
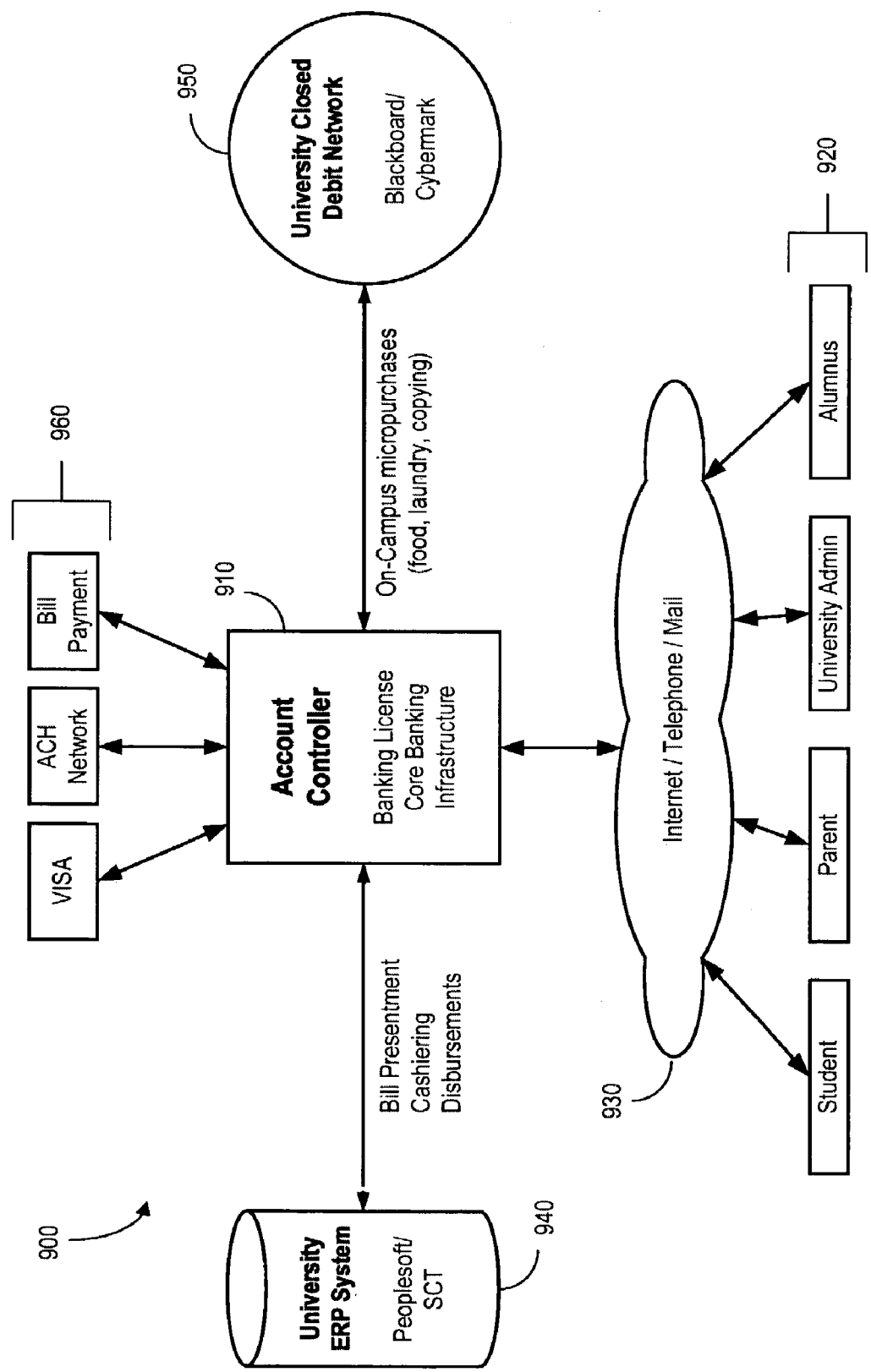
FIGS. 9 through 11 illustrate several system overviews according to some embodiments of the present invention.
Figure 10:
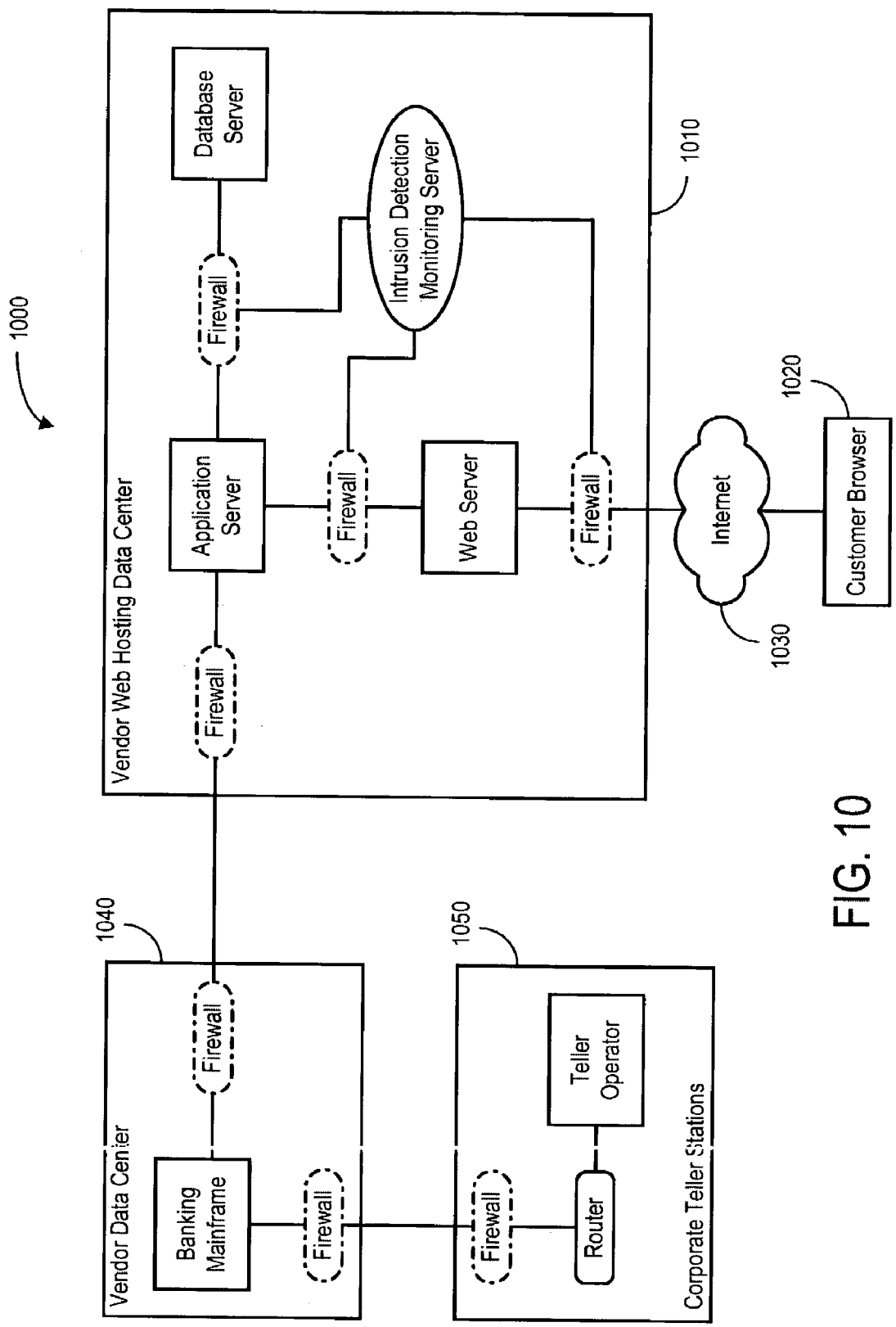
Figure 11:
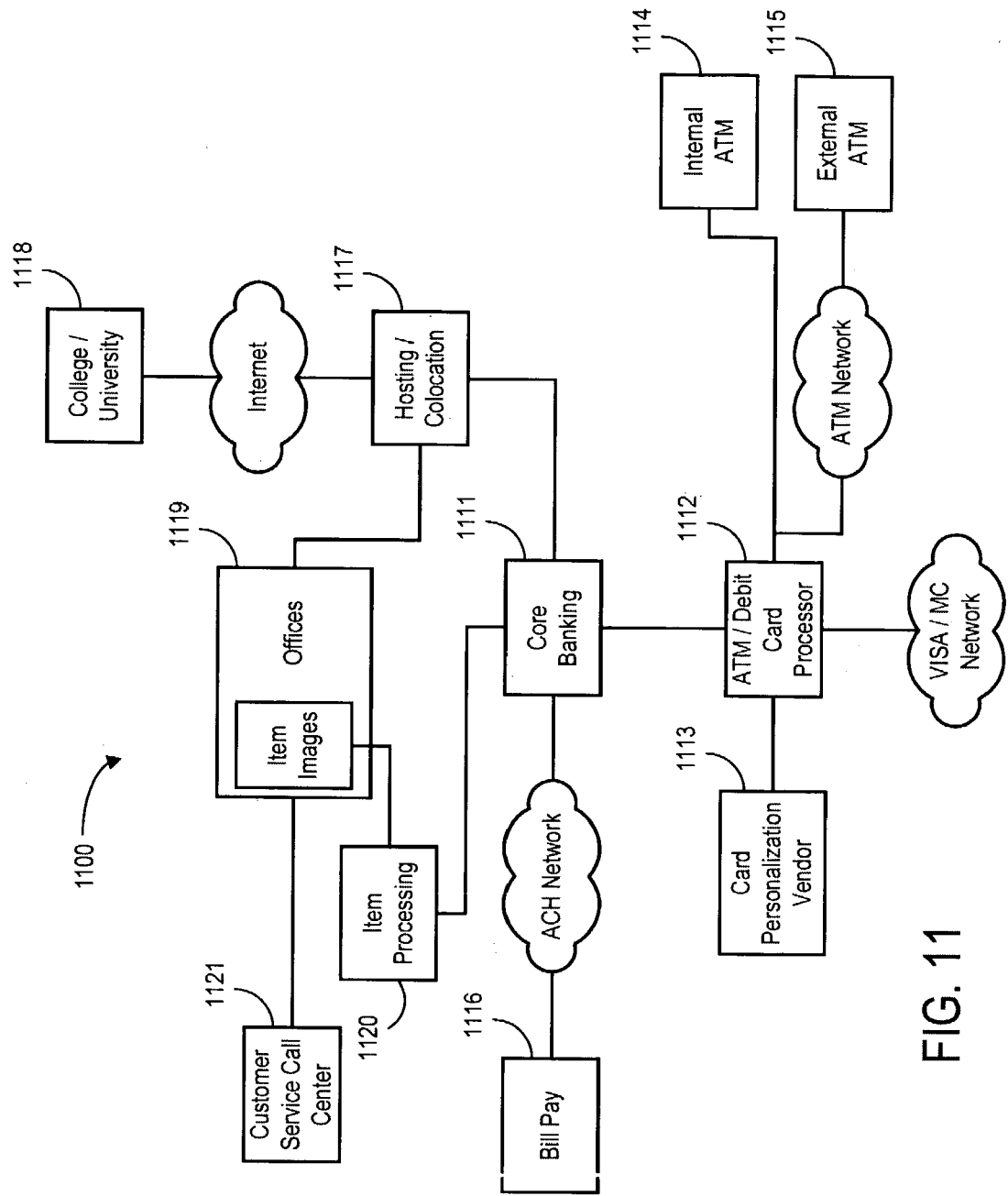

FIGS. 9 through 11 illustrate several system overviews according to some embodiments of the present invention. In general, the systems may connect university administrative software, one-card systems, and core banking infrastructure. According to one embodiment, a Web front end provides the primary interface for end users as well as university administrators. Customer service may be provided via telephone and Internet Customer Relationship Management (CRM) solutions. Integration with university systems may allow account holders to make purchases on campus through existing university infrastructure. The same may also be used to make purchases wherever VISA® or MASTERCARD® are accepted via check card functionality. Integration with a university ERP system may allow for automated bill presentment, payment, cashiering, account reconciliation, and funds disbursement.

For example, FIG. 9 illustrates a system 900 wherein an account controller 910 may exchange information with educational institution members 920 via a communication network 930. For example, the account controller 910 may provide transaction history information to a student's parent via a Web site.

The account controller 910 may also exchange information with a university ERP system 940 (e.g., bill presentment, cashiering, and/or disbursement information). Moreover, the account controller 910 may exchange information with a university closed debit network 950. For example, the account controller 910 may receive from the debit network 950 an indication that a student has used his or her account to purchase food or textbooks.

Other systems 960 may also exchange information with the account controller 910. For example, a credit card system, an Automated Clearing House (ACH) network, an Electronic Funds Transfer (EFT) system, and/or a bill payment system (e.g., an online bill payment system) might exchange transaction information with the account controller 910.

Referring to FIG. 10, a Web site may be securely integrated with a core banking system in order to provide a seamless experience for the customer. For example, a vendor Web hosting data center 1010 may include firewalls between the Web server, an application server, and a database server. The vendor Web hosting data center 1010 may also include an intrusion detection monitoring server to further protect internal information. In this way, the vendor Web hosting data center 1010 can exchange financial information with a customer browser 1020 via a public network 1030 (e.g., the Internet) in a secure manner.

Moreover, a secure, private line may be installed between the vendor Web hosting data center 1010, a vendor data center 1040 (e.g., housing a banking mainframe), and corporate teller stations 1050 (e.g., associated with tellers or customer service representatives) to protect financial information.

FIG. 11 is an illustration of a system 1100 in which a core banking unit 1111 exchanges information with an ATM/Debit card processor 1112. For example, the ATM/Debit car processor 1112 may arrange for cards to be produced via a card personalization vendor 1113, process credit card transactions (e.g., via the VISA® and/or MASTERCHARGE® networks) and/or facilitate transactions at internal ATM devices 1114 and external ATM devices 1115. Similarly, the core banking unit 1111 may communicate with a bill pay unit 1116 (e.g., via an ACH network) to facilitate automatic banking transactions.

An item processing unit 1120 may receive information from the core banking unit 1111 (e.g., check information) and store item images at an office 1119 (e.g., to be later retrieved by a customer service call center 1121). The core banking unit 1111 and/or the office 1119 may also exchange information with the college or university system 1118 via a hosting device 1117 (e.g., financial aid information may be transmitted from the college or university system 1118 to the core banking unit 1111).

Some features that might be associated with the system 1100 include: online account access, transferring money to/from bank and credit card accounts, sending money to other bank account holders, purchases at merchants, ATM access for cash withdrawals, online account maintenance, telephone customer service, and rewards programs.

Member Device Displays

Figure 12:
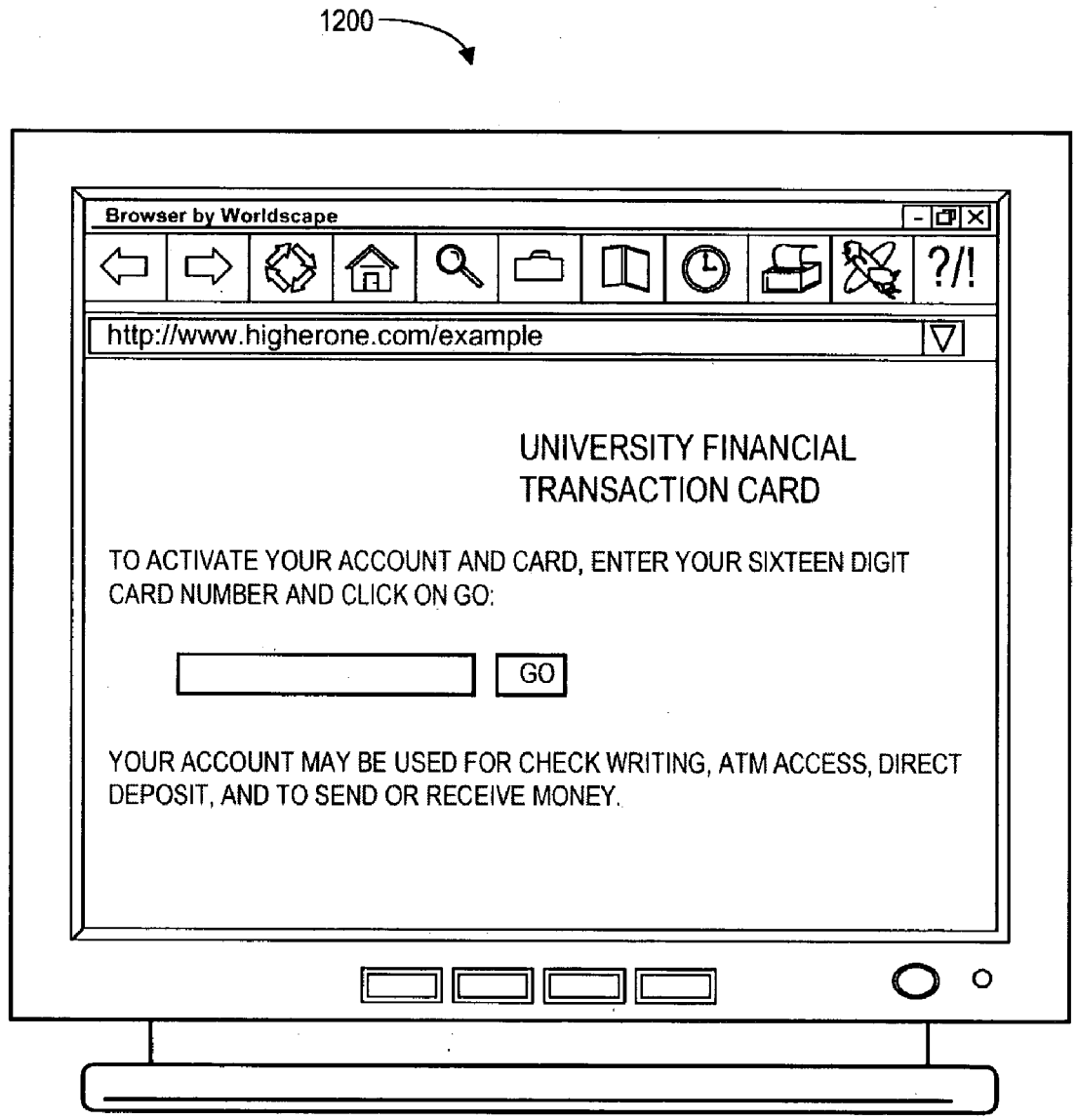
FIGS. 12 through 20 illustrate member device displays according to some embodiments of the present invention.

FIGS. 12 through 20 illustrate displays that may be provided via member devices 30 according to some embodiments of the present invention. In particular, FIG. 12 illustrates a display 1200 that may be used by a member who is interested in activating his or her account. In this case, the student (who has already received a physical card) enters a sixteen digit card number to initiate activation.

Figure 13:
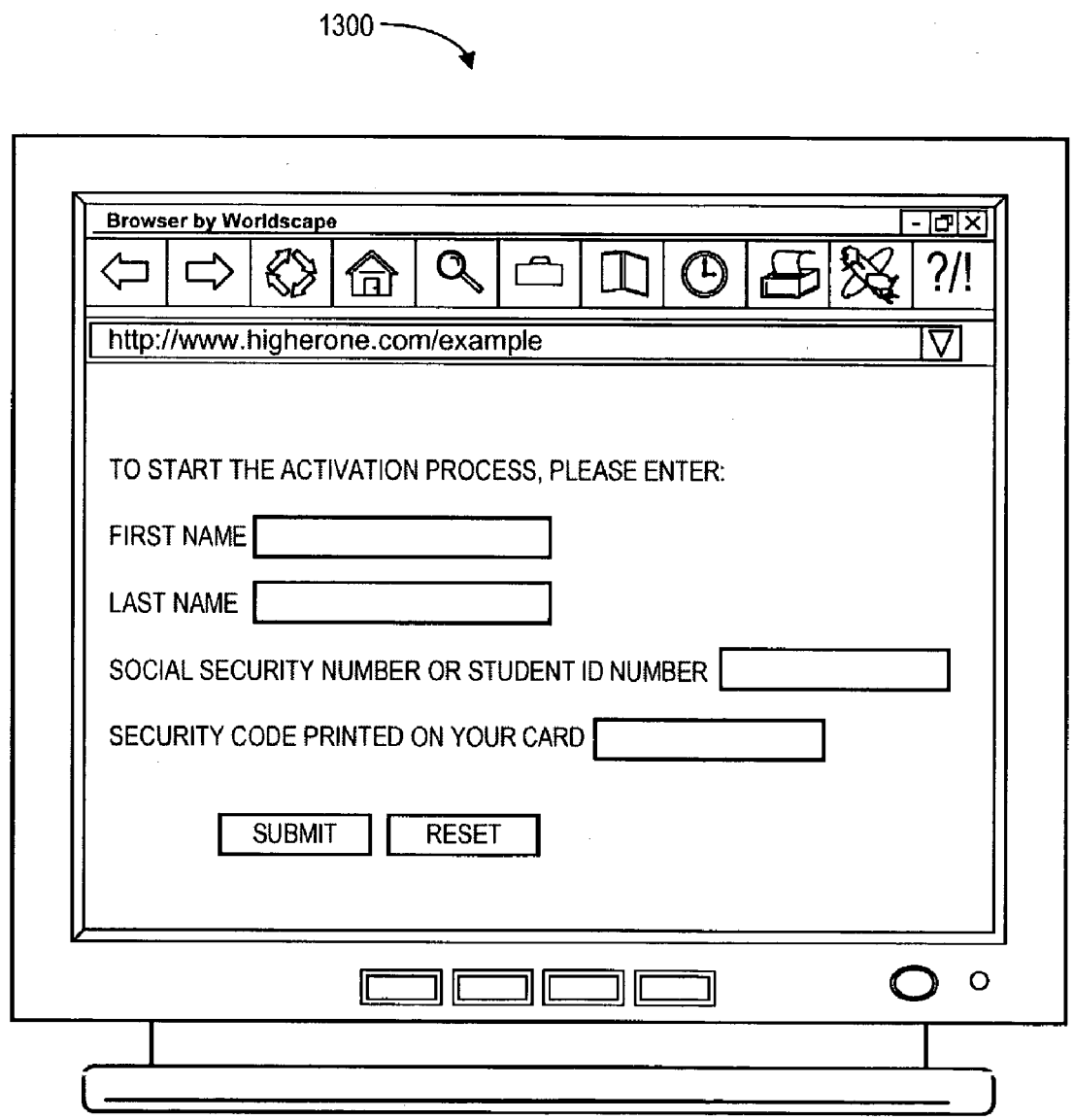
Figure 14:
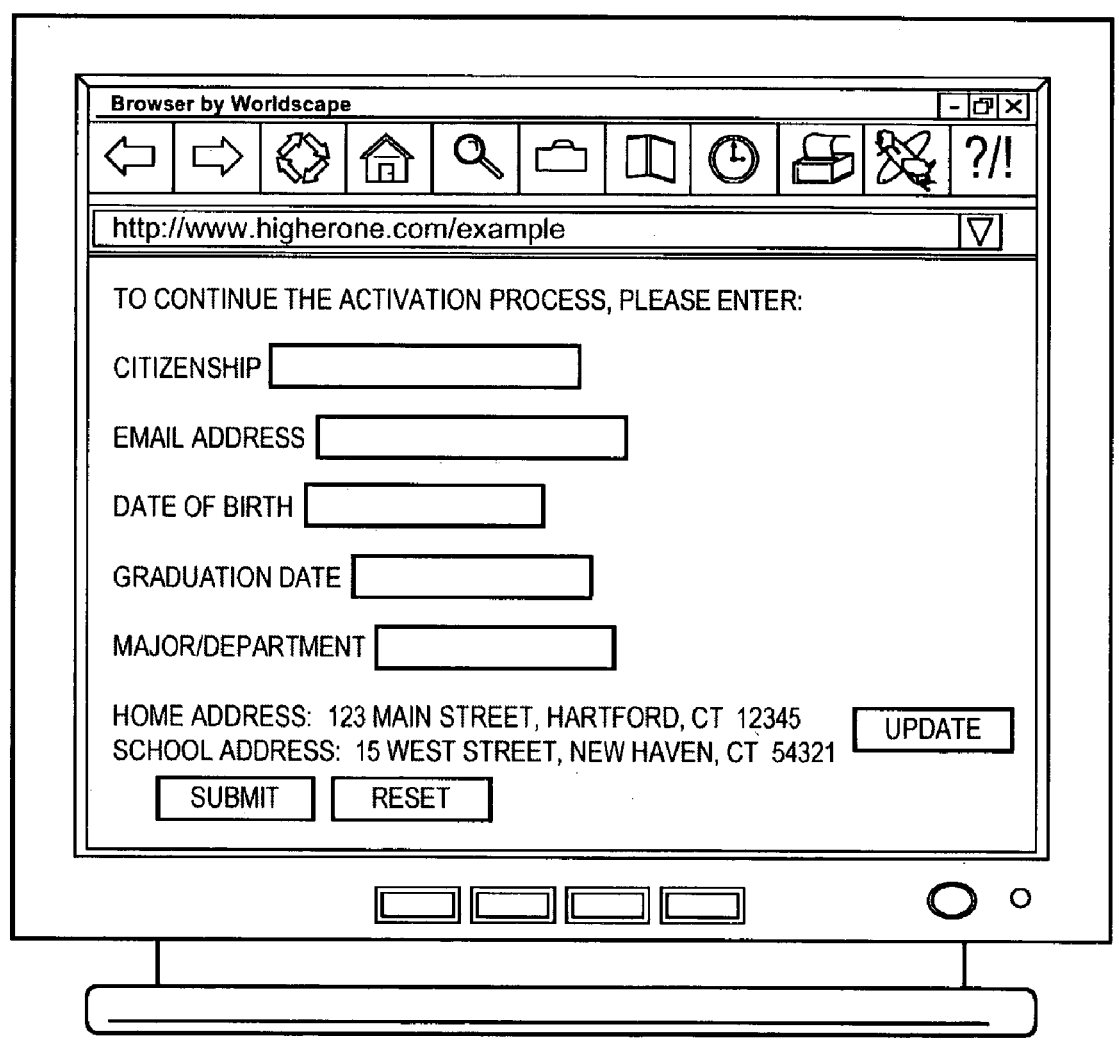

After entering the card number, the student uses the display 1300 illustrated in FIG. 13 to provide his or her name, Social Security number, and a security code printed on his or her card. The display 1400 illustrated in FIG. 14 may then be used to provide the student's citizenship information, email address, date of birth, anticipated graduation date, and major or department. This display 1400 may be used to verify (and, if needed, to update) the student's home and school address.

Figure 15:
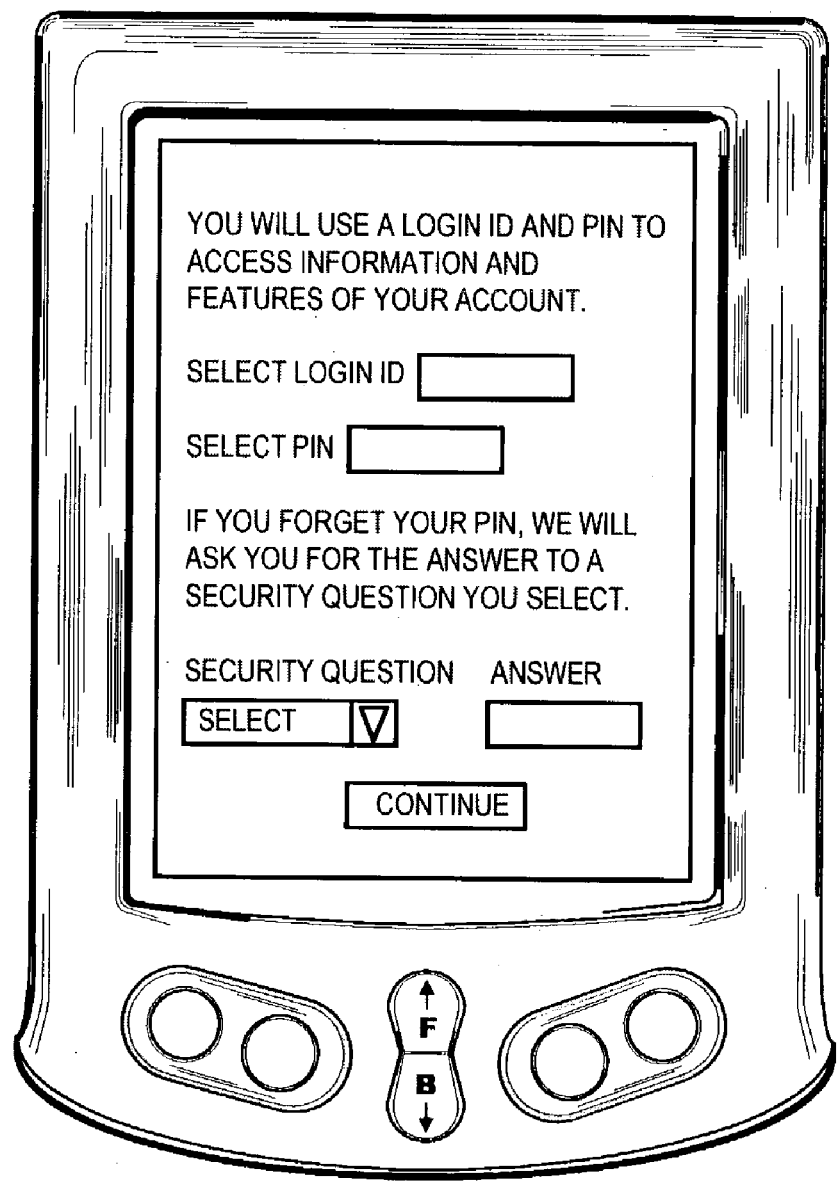

FIG. 15 illustrates a display 1500 that can be used by a student to create a login identifier (ID) and Personal Identification Number (PIN) that he or she can used to access information about the account. Note that the display 1500 is illustrated on a PDA, but any type of member device 30 may be used.

Figure 16:
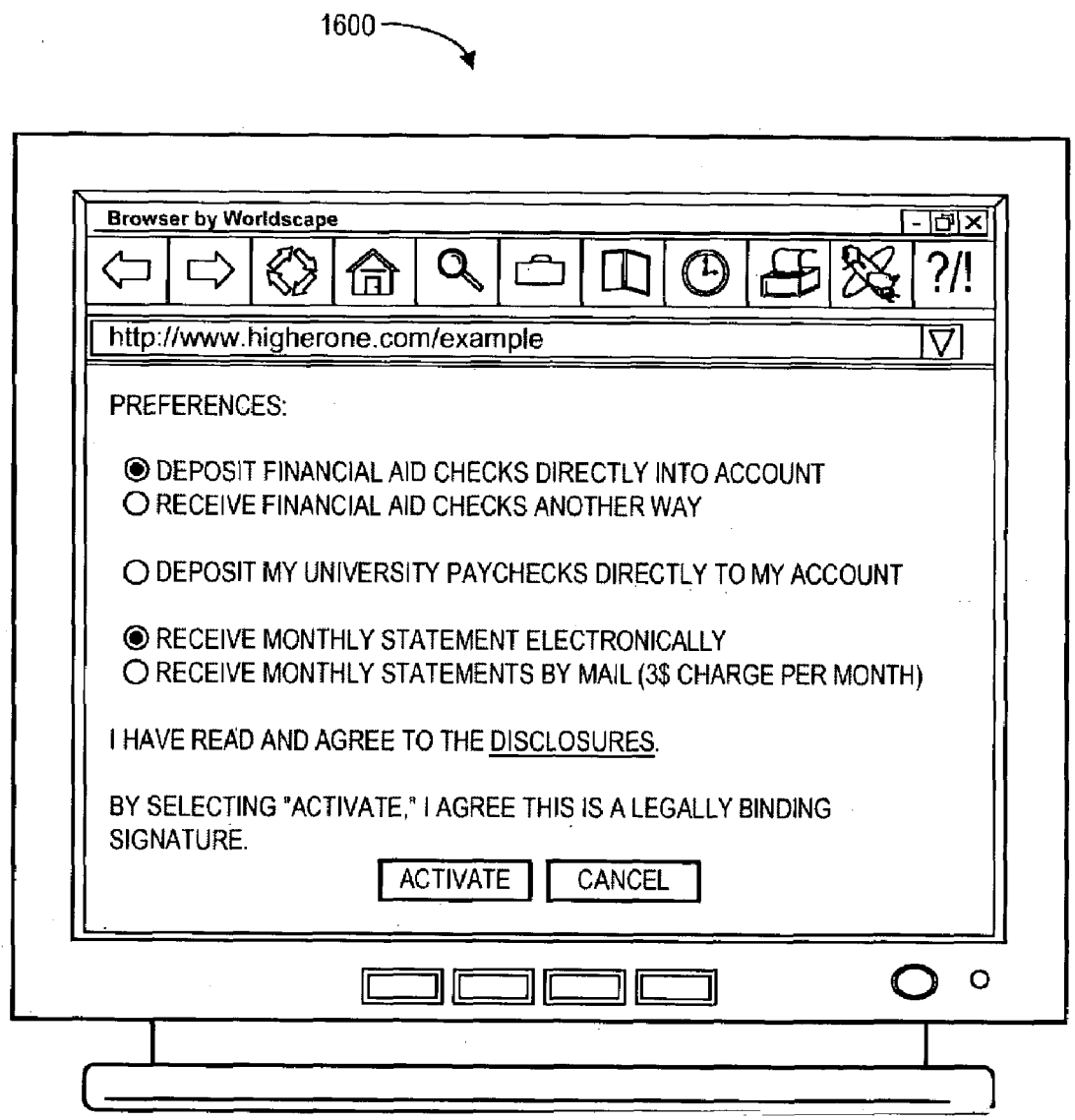

FIG. 16 illustrates a display 1600 that can be used by a student to set up account preferences. In particular, the student can elect whether or not financial aid checks should be deposited directly into his or her account. In the case of a university employee, he or she can determine if paychecks should be deposited directly into the account.

Figure 17:
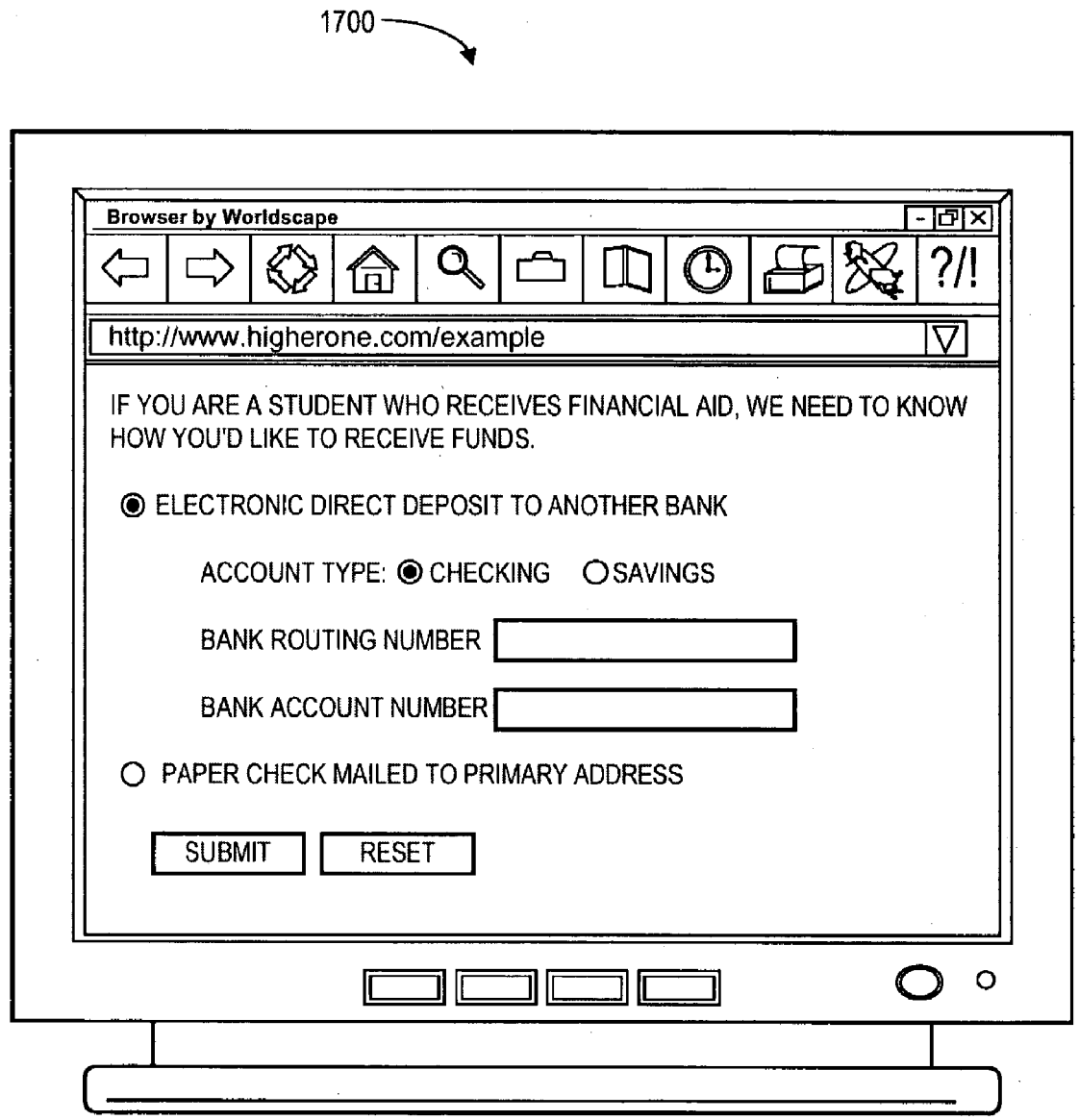
Figure 18:
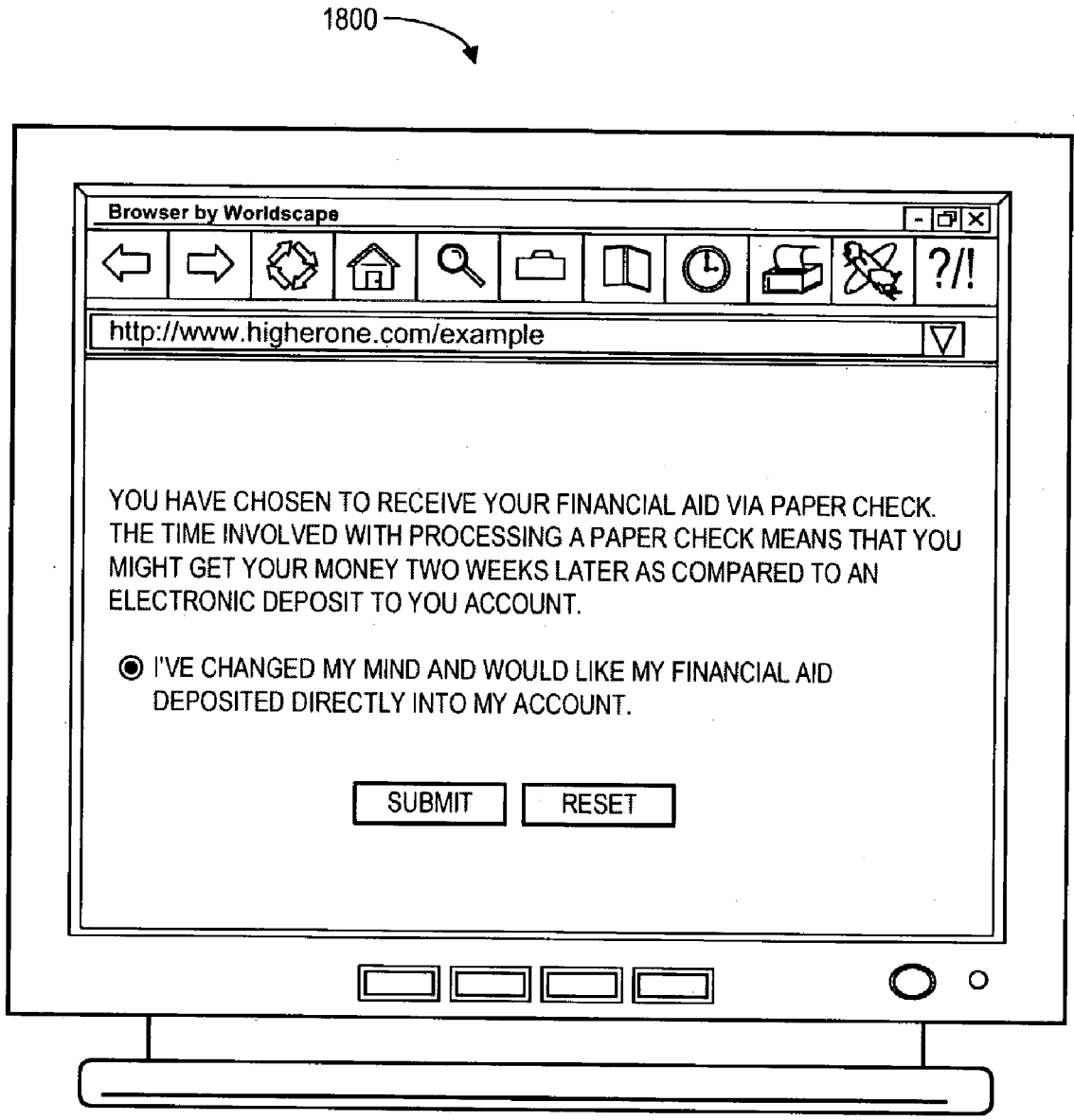

FIG. 17 illustrates a display 1700 that can be used by a student who does not want financial aid checks to be deposited directly into his or her account. In this case, the student might provide bank routing and account numbers associated with another bank or elect to have a paper check sent via postal mail. FIG. 18 illustrates a display 1800 that can be used to encourage a student to have financial aid checks deposited directly into his or her account.

Figure 19:
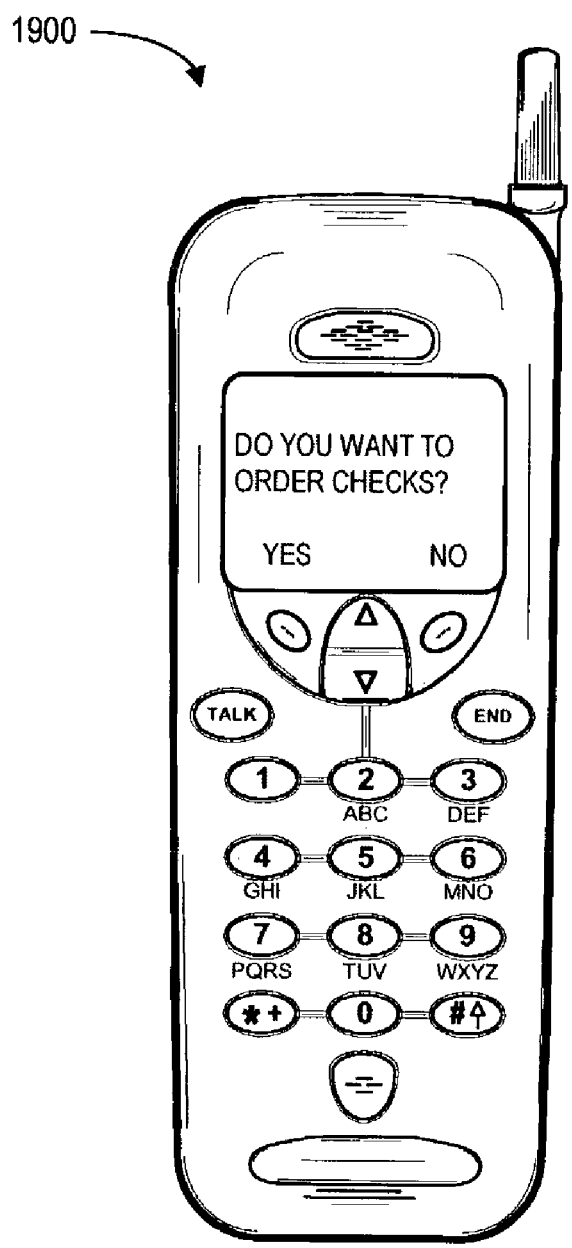

FIG. 19 illustrates a display 1900 that can be used by a student to order checks for his or her account. Note that the display 1900 is illustrated on a wireless telephone, but any type of member device 30 may be used.

Figure 20:
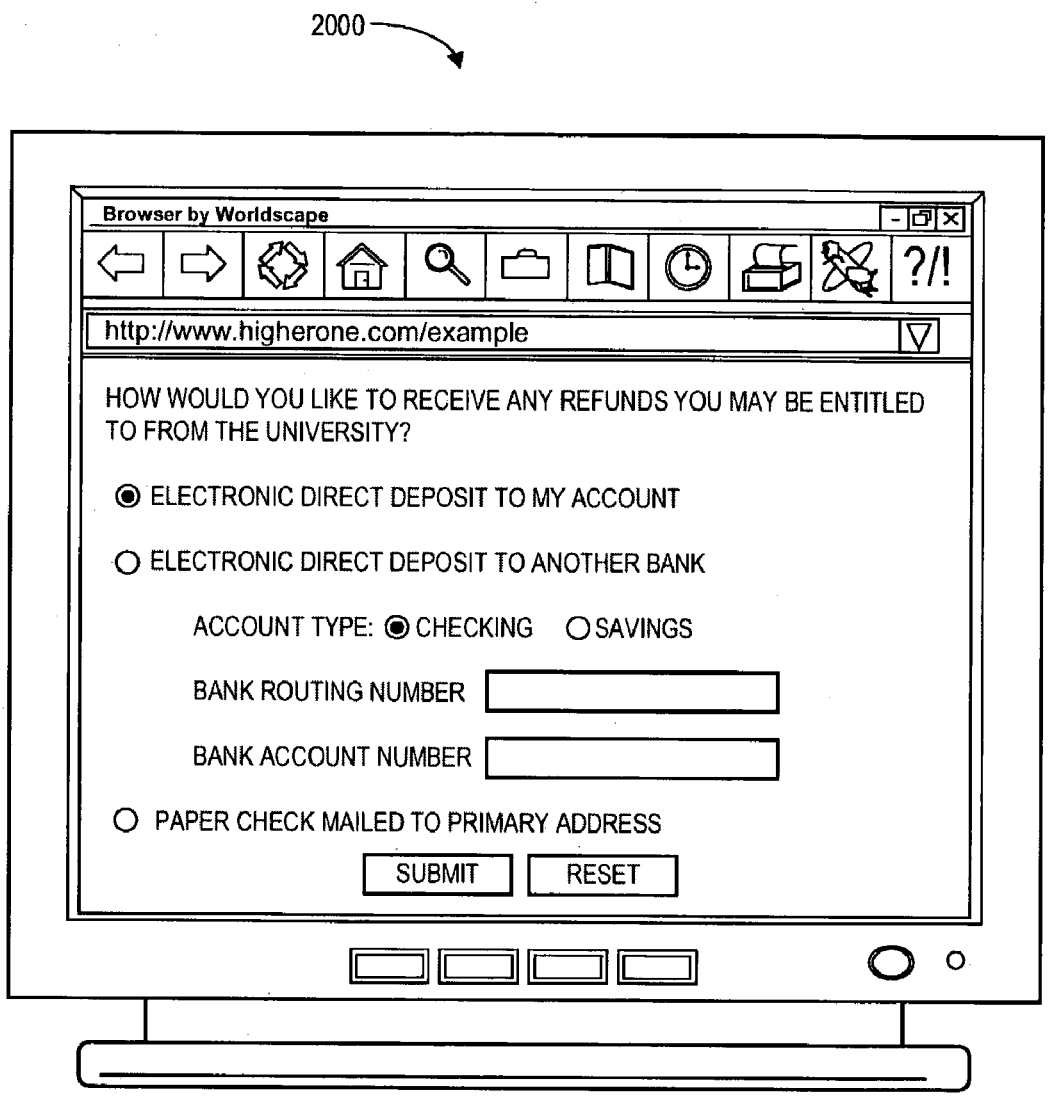

FIG. 20 illustrates a display 2000 that can be used by a student to elect whether or not refunds from the university should be deposited directly into his or her account. If the student does not want the refunds to be deposited directly into his or her account, bank routing and account numbers associated with another bank may be provided or the student may elect to have a paper check sent via postal mail.

According to some embodiments, other displays provide to a member an explanation of how his or her account may be used. Such displays might indicate, for example, that funds can be added to the account by: (i) depositing money electronically from another bank account, (ii) depositing a paper check, (iii) inviting someone to send money to the account, (iv) arranging for a paycheck to be deposited into the account, and/or (v) arranging for the university to put money it owes to the member into the account. Similarly, the display might indicate that funds can be accessed via: (i) spending on campus, (ii) spending wherever VISA® or MASTERCARD® credit cards are accepted, and/or (iii) an ATM device. Other information might also be included on the display, such as information about a rewards program and/or answers to frequently asked questions.

Account Creation

Figure 21:
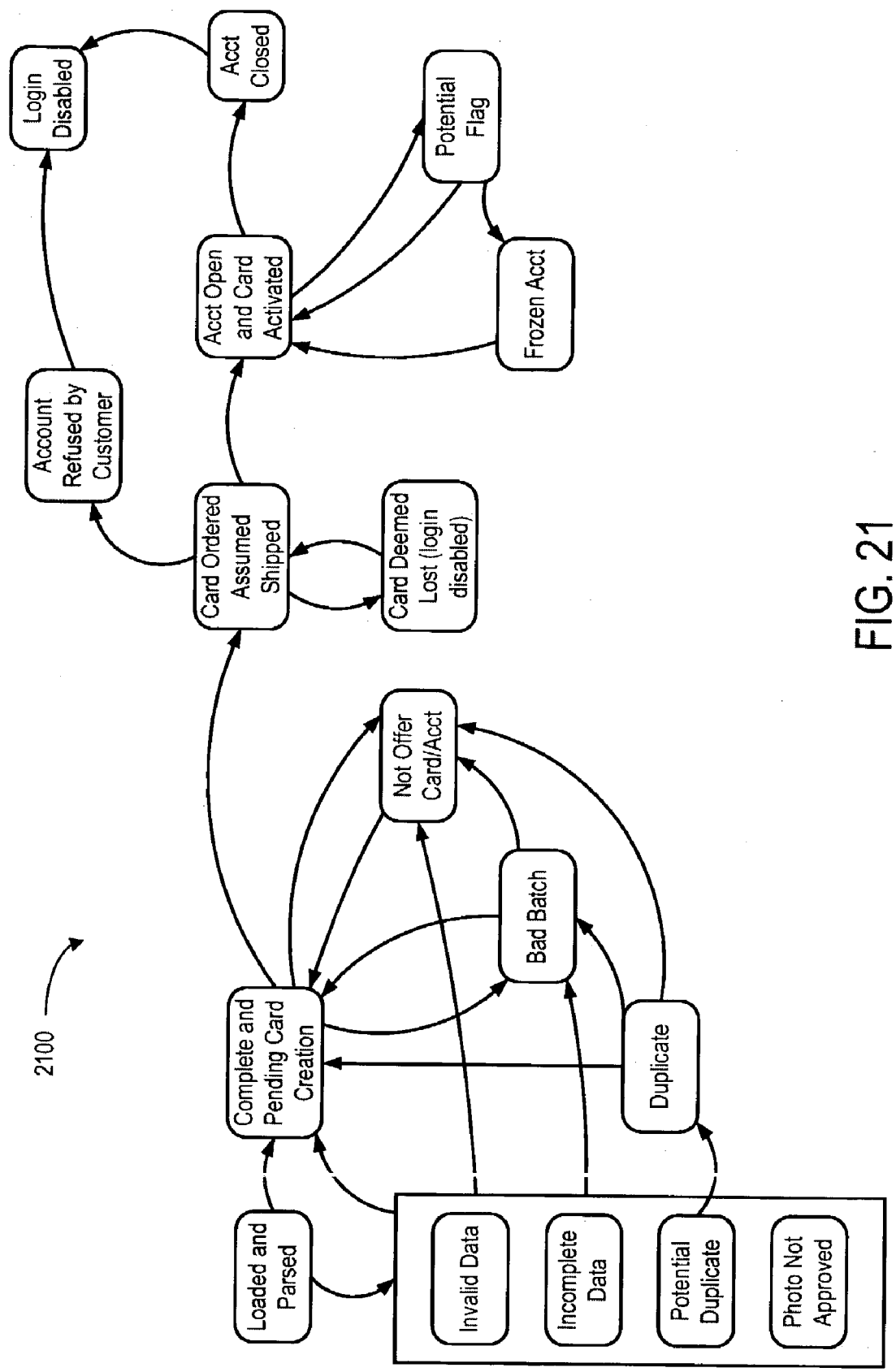
FIG. 21 is an account creation state diagram according to some embodiments of the present invention.

FIG. 21 is an account creation state diagram 2100 according to some embodiments of the present invention. In particular, student information is loaded (e.g., from a university) and parsed. If the student information is valid, the loading process is complete.

However, it may be determined that the student information is not valid. For example, the student information might contain invalid data (e.g., an impossible date of birth), incomplete data (e.g., no home address may have been included), potentially duplicate data (e.g., two entries might have the same student name), and/or a photographic image may not be approved (e.g., because the image is too blurry). In any of these cases, a card might not be created.

When valid student information has been received, the a physical card is ordered (e.g., via a third party). If the account is refused by the customer (e.g., he or she access the Web site and indicates that he or she does not want the account), login associated with that account is disabled. If nothing is heard from the student for a predetermined period of time (e.g., three months), the system assumes that the card has been lost (and login associated with that account is disabled to prevent fraud).

If the account is accepted by the customer, the account is opened and the card is activated. If the account is closed for any reason, login associated with that account is disabled. If a potential flag is generated, the account may be frozen. For example, if a flag is generated in accordance with the Office of Foreign Assets Control (OFAC), the account may be frozen until an investigation is performed.

A more detailed description of an account creation process, according to one embodiment of the present invention, will now be provided. In general, the account creation process may include four stages: (i) obtaining data, (ii) scrubbing data, (iii) producing cards, and (iv) opening accounts.

Obtaining Data

In this stage, personal data associated with eligible accountholders is received from a school. For example, university personnel may export data from an ERP system to an ASCII flat file. According to one embodiment, a direct link such as an Open Database Connectivity (ODBC) link to a database is used for running Structured Query Language SQL queries. For example, the following information might be received from the school (some of the values could be null):

Social Security number;
Student ID number;
Name (first, middle, last);
Date of Birth;
Permanent Address (street, city, state, ZIP code, country);
Permanent Telephone Number;
Student Address (street, city, state, ZIP code, country);
Student Phone Number;
Graduation Date;
Status (student, faculty, staff);
Major/Department;
electronic mail address;
drivers license number;
passport number (for foreign nationals);
citizenship;
barcode; and
Parent Name and Address information.

According to one embodiment, university personnel upload the file via Hypertext Transfer Protocol over Secure Socket Layer (HTTPS) to the account controller 700 (e.g., with login, timestamp, and IP address logging to provide audit trail). When a new file is to be uploaded, a message may be transmitted to back-office personnel responsible for account creation (e.g., to permit automation of the process). According to another embodiment, an ODBC or other direct connection to the ERP system are used to query the database (instead of having university personnel export information from the database).

University personnel may also provide access to (or send) digital photos in an industry standard format, such as JPEG. These photos may be identified by filename or other means so that they can be associated with the appropriate person. One method is to have file named with Social Security number of person. These digital photos may be loaded into a Web application database and automatically associated with the other data on that person.

Scrubbing Data

In this stage, information is parsed and processed for accuracy and completeness. According to one embodiment, an operator opens the ERP export file and checks it for obvious errors or potential fraud. If this check fails, a supervisor is involved and the issue is resolved appropriately (e.g., university personnel might be contacted). This type of check might include:

Do the names seem to be realistic? No obvious fictitious people or profanity?

Does the file seem intact and well formatted? No obvious garbage or odd non-printable characters? No obvious long runs of duplicates?

Does the number of entries roughly match expectations? Are there more entries than people in the campus community? Is a file from the school of roughly this size expected at this time?

If the file as transmitted during non-business hours, is that normal?

Back office personnel may then initiate the loading of the ERP export file into a Web application database. The Web application retains a file/batch unique identifier with each individual record so that a whole batch can be manipulated at a later time or for audit.

The Web application may automatically run one or more of the following checks on the records and flag potential problems. Even those records that pass all of these checks may still be considered incomplete until a photo is associated with the record.

Invalid Data or Problem Parsing—System performs the following checks and records that it fails on are flagged as such (any other problems parsing are flagged, as well): Social Security number (check for 9 digits); Graduation Date (should be in future); Status should be one of the valid choices student, faculty, staff, etc.; and Barcode (check for valid length for school).

Potential Duplicate or Fraud—Only look for duplicates within records that are not flagged as incorrectly parsed: Social Security number match (the Social Security number should be unique to that school); Name Match (First and last name exact match within same school should be flagged as such); and Address Match (If full address matches another record flag because could be potential duplicate or fraud).

Pick Address of Record—If permanent country is non-US then change permanent to Student Mailing address, provided it is in the US. If only one address than that is the address of record.

Incomplete Record—Information on a particular person is not complete, until each of the following fields has a non-null valid value:

Social Security Number (or Passport Number)
First Name
Last Name
Complete Address of Record (Street, City, State, Zip, Country)
Digital Photo
Student ID number (if needs to be printed on card)
Status (if needs to be printed on card)
Barcode (if needs to be printed on card)

Personnel may again manually review sample parsed records from the imported batch, such as to determine if the First and Last Name reversed or whether or not an address looks valid According to some embodiments, photographs are then imported into the database and manually inspected to check photos for compliance with, for example, VISA® regulations. Until photos are manually approved, they are considered to be unapproved and the record is held back from card production. The appearance or interpretation of any of the following on apparel, banners, signs, etc., in the foreground or background of photos is prohibited:

i. Competitive marks/names (e.g. MasterCard, American Express)
ii. Political statements (e.g. Neo-nazi, Pro-Life, etc.)
iii. Branded products
iv. Copyrighted or trademarked material not owned by Partner
v. Celebrities/musicians/public figures/athletes
vi. Phone numbers
vii. Socially unacceptable groups (e.g. gangs, supremacy, etc.)
viii. Provocative or sexual content
ix. Profanity or obscenities
x. Any reference to the Olympic Games or events, or any Olympic marks, logos, designations, or authenticating statements
xi. Anything that would result in non-acceptance or other problems at the Point-of-Transaction.

Invalid student data may be addressed in a number of different ways. For example:

i. Invalid Data. Operator may use common sense or contact the school to obtain alternant data and correct the data in the record.
ii. Potential Duplicate. Displays with comparison against the potentially duplicated record(s). Operator can elect to flag the record an actual Duplicate or flag record Pending Card Production.
iii. Incomplete Record. Operator may contact the school to obtain necessary data and enter data to update the record.
iv. Non-Compliant Photo. Operator may contact the school to obtain another digital photo and upload it into the record. As another approach, the photo may be digitally altered to create an image that is compliant and still serves its function to identify the student.

Producing Cards

In this stage, information is sent to a banking core and a card personalization vendor so that cards can be created. In particular, an operator may initiate the creation of a card order for each record with valid student information. For example, the operator may obtain confirmation of embossing file receipt by the card personalization vendor and the number of card orders are received by:

i. System creates the embossing file including the Primary Account Number (PAN) and transmits it, along with photos and school-specific information, to the card personalization vendor. A copy of the embossing file is stored and the PAN and is stored in the database along with the Card Verification Value 2 (CVV2).
ii. System uploads account information to the core processor. This in turn initiates a message to the debit card processor (who is responsible for creating an embossing file and transmitting). Then account controller 700 attaches photos and school-specific information (ID number, status) and forwards it to the card personalization vendor.

The card personalization vendor then creates the whole fulfillment package and sends it to a card office or directly to the cardholder. The fulfillment package may be inside a business size envelope and include: the card with activation sicker that instructs the student to visit the Web site, a university branded card carrier, marketing materials that explain the bank account, and any applicable terms and conditions.

The account controller 700 automatically loads the PANs into the school's system. According to some embodiments, the cards are non-functional in the on-campus system until activated. The cards are then delivered (in some cases, the cards are shipped to a card office at the school, in other cases they are sent via postal mail to the address of record). If shipped to a card office, the school may be responsible for passing out the cards.

Opening Accounts

In this stage, accounts are opened, cards are activated, and banking service can proceed normally. As directed in the fulfillment package, the student visits a co-branded website, selects an activation function, and enters shared, secret information to be considered authenticated. This shared secret information may be, for example, a correct input of the following (with too many incorrect attempts suspending login ability):

Card Number
CVV2
Social Security number (or Student ID)
First Name (as printed on card, even if incorrect)
Last Name (as printed on card even if incorrect)

The accountholder may also be asked to verify the personal information listed below (and correct if appropriate). According to one embodiment, the system requires input for the all except starred (*) information:

LoginID
Personal Identification Number (e.g., 4-digit PIN)
First Name
Middle Name*
Last Name
Nick name*
Date of Birth
One complete address (which becomes Address of Record)
One telephone number
Permanent Address*
Permanent Phone Number*
Student Address*
Student Phone Number*
Graduation Date*
Major/Department*
electronic mail address
Passport number (for foreign nationals not optional)
Citizenship
Hint/Shared Secret The accountholder may also supply his or her preferences. For example, the student may click to another page or scroll down to read account disclosure information that accountholder will accept. The Web page might also state that these preferences can be changed at any time and/or allow them to refuse the account. Other options that might be selected by the student and information that might be provided to the student include:

i. Electronic statements/transaction history ($3/month fee),
ii. Having financial aid, refunds, and other school disbursements directly deposited into bank account,
iii. Payroll from school direct deposited into this account,
iv. Order checks,
v. Frequent questions and answers,
vi. ATM information (locations, no fee on-campus), and
vii. Customer service contact information.

Once the perspective accountholder has entered data and requested an account, the system automatically performs a check against a pre-determined list of "problem accounts" (e.g., account may have had a duplicate name). The account controller 700 may then automatically transmit information to the core processor to either:

i. open the account in the core, or ii. flag account in core as now being legally open.

Moreover, the system may automatically notify a debit card processor of card activation (e.g., by transmitting a batch of notifications, including PIN selections, via the core processor). A university onecard system may also be notified in an automated fashion to un-suspend and activate the card for use in the on-campus system.

In this way, the present invention may provide a consumer depository bank account distributed through university partnerships. The account may, according to some embodiments, be accessed through a campus identification card and via a Web site, to provide a student with full banking functionality, the ability to electronically receive funds from the university or individuals, and the ability to make necessary small value purchases on-campus through the school's onecard system.

The account benefits the university by helping to streamline funds disbursements, bill presentment, payment, and cashiering to reduce administrative burdens. Moreover, the university may share in revenue generated by such a program. Moreover, a dependable number of new customers can be expected each and every year (i.e., when new students arrive).

Automatic Distribution

According to some embodiments, the university always provides the system's transactional deposit account to each member of the campus community, as it is an automatic part of the onecard program (i.e., the student does not opt-in or opt-out of this feature). From an operational, and practical perspective of the school and student, a bank account is set-up and linked to each onecard at (or before) the time of creation.

To become automatic, the system may need to integrate (at least partially) with on-campus systems. Integration may be required, for example, with the onecard system for initial card issuance and re-issue on replacement. Moreover, the system may integrate with the ERP system and/or Student Information System (SIS) to get personal information that facilitates account and card creation.

Account Merging

By merging the on-campus transaction account and a bank account, some embodiments may achieve greater customer convenience, higher levels of penetration, increased deposits and revenue, and improved functionality for university partners. There are no more "atomic" accounts, as the two accounts have been combined. In some sense, from the perspective of the bank, the closed transaction network on-campus will be another interchange with which it is linked, just like VISA® or CIRRUS®. From the perspective of a student, in order to make purchases in the closed on-campus network (like laundry or vending), he or she only needs to have money on deposit with the system via the merged account.

The merged account approach may also offer improved functionality for university partners, because it can provide a single point for money flowing among any of the following parties: universities, students, parents, staff, faculty and alumni. In order for the merged account to be used effectively for alumni donations, grant administration, procurement, financial aid refunds, tuition payments, and person-to-person payments, it might need to be an integrated part of the campus community's financial management. Other features that may be provided via a merged account include investments and short (or long) term borrowing.

Implementation Considerations and Various Embodiments

A merged account program might be implemented in a number of different ways. Some implementations will now be described.

Automatic Refill

Under an automatic re-fill model, customers may still be aware that they have different accounts (bank and stored value), but they do not have to manage the balances. The student (or other party) may set a trigger level (e.g., $10) and a target level (e.g., $25). Each night, the system connects to the onecard system to check the current on-campus account balance. If the on-campus balance is below the trigger level, the system automatically transfers enough money to move the balance to the target level. Settlement with the school is achieved later using another mechanism.

According to one embodiment, this can be achieved with the same level of onecard system integration that would be required for atomic accounts. The additional work could be handled by business logic that could be built into the systems, rather than requiring changes within the onecard system.

Positive Balance File

Similar to signature-based debit cards, the bank system could interface with the on-campus system via a positive balance file. For example, the bank system might update the on-campus system's balance record with the lower of a target risk level (e.g., $50) or the current bank account balance on a nightly basis. During the day, as customers made purchases via the on-campus network, the onecard system would track transactions and deduct value from the balance in its records. Each night, before updating the balance, the system would either (i) calculate the difference to aggregate transactions before they hit the core (i.e., keep detailed transaction history and accounting on the onecard system and do more generalized settlement for purposes of the core) or (ii) download the detailed transaction history and settle it against core information.

Online Real-Time

In this case, the onecard system is no longer responsible for the final authorization of on-campus transactions, but rather checks in real-time against the balance stored in the core banking software. Such an approach may reduce fraud because there is only one record of the balance.

Bundled Transactions

A hybrid between a positive balance file and the online real-time model is to bundle a series of transactions together so that they are authorized and tracked locally until a certain dollar amount has been reached. At that point, it is authorized or shipped over to the system. A goal would be to create a system that reduces the risk of the positive balance file model while reducing the operational and cost impact of handling a high volume of low value transactions.

Onecard System for System Integration

According to some embodiments, the school's campus ID card functions both in the on-campus onecard system and in off-campus networks (for example, VISA or MASTERCARD). In order to function properly off-campus, the card will be encoded as a VISA Check Card or MasterMoney Debit Card.

When a new person joins the campus community, he or she is provided with a campus ID card. Note that due to credit card company regulations, the financial institution may be responsible for selecting a card number. Once this number has been selected, it needs to be loaded into the onecard system so that the card is recognized as valid by the on-campus network. This might be accomplished in a manner similar to that employed by onecard system for existing integration with university's ERP system. When an account holder has a lost or stolen card and it needs to be re-issued, a new card number may need to be loaded into the onecard system to replace the old number.

On demand (or on a periodic basis) the system may query the onecard system for balance information. The system may also display a transaction history to students via a Web site. This history may include both on-campus and off-campus transactions. As a result, some facility for exporting this information from the onecard system may be desired (e.g., in nightly batch or in real-time on request).

Student Refunds

It may be that a student is entitled to receive a refund from a university. For example, a student who needs to pay ten thousand dollars in tuition and receives fourteen thousand dollars in financial aid might be entitled to a four thousand dollar refund from the university. Moreover, governmental regulations may require that the refund is provided to the student within a pre-determined period of time. This can be a difficult task for a university, especially when a significant number of refunds need to be provided.

According to some embodiments, the system described herein may be used to automatically provide such a refund to the student. For example, as described with respect to FIG. 20, a student might indicate a preferred method of refund delivery when he or she activates the account (e.g., via the account, a third party bank, or a paper check sent via postal mail).

When it is determined that a refund needs to be provided to a student, the account controller 700 retrieves the appropriate method of refund delivery associated with the student. It is then automatically arranged for the refund amount to be provided to the student in accordance with his or her preferred method. Note that the university may determine whether or not a refund needs to be provided to the student (as well as the amount of the refund). According to some embodiments, the university then sends a message to the account controller 700 (e.g., a message listing a batch of student identifiers and associated refund amounts) and/or transfers an appropriate amount of money to a refund account.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

In many embodiments described herein, bank accounts are distributed through a relationship with an educational institution, such as a university. According to another embodiment, however, bank accounts can instead be distributed through a relationship with any other type of institution that has a defined constituency and/or issues identification cards, such as a corporation, a government entity, or a charitable organization.

Moreover, according to still other embodiments of the present invention, member interaction may be customized. For example, a co-branding or private label aspect of the present invention may allow interaction with members to be customized and in the name of an affiliated institution (e.g., a university). This may include, for example, all mailing and cards containing or being produced with the university or institution's logo, name, or brand. Additionally, a member upon interacting with a Web site (or similar customer service display system) can receive text and images that are dynamically chosen, generated and/or displayed based in part on the institution with which the member is affiliated.

Note that the banking system might interact with students associated with a number of different universities. In this case, an appropriate educational institution associated with a member can be determined and a presentation of information to the member may be adjusted based on the determined educational institution. For example, the colors and logos on a Web site may be modified as appropriate for a particular student's university. Similarly, the text and symbols on a bank card or marketing material could be adjusted.

The present invention has been described in terms of several embodiments solely for the purpose of illustration. Persons skilled in the art will recognize from this description that the invention is not limited to the embodiments described, but may be practiced with modifications and alterations.

What is claimed is:

1. A computer-implemented method performed by an account controller to facilitate a distribution of bank accounts to students from an educational institution, comprising:

receiving, from the educational institution, information associated with a student;

validating the received information;

determining that a soft bank account will be created based on the received information;

establishing the soft bank account for the student based on the received information, wherein the soft bank account is established prior to receiving any indication of acceptance from the student;

delivering a token associated with the student to the student;

distributing a disbursement from the educational institution to said soft bank account or to a pre-existing accessible bank account associated with the student;

receiving an indication of acceptance from the student that includes a request to convert the soft bank account to an accessible bank account; and converting the soft bank account to an accessible bank account in response to the received indication of acceptance and providing said student with access to said disbursement via the token.

2. The method of claim 1, wherein the indication of acceptance is received via at least one of: (i.) the member, (ii) the educational institution, (iii) a merchant, (iv) a public network, (v) a private network, (vi) a telephone call, (vii) the Internet, or (viii) a representative.

3. The method of claim 1, wherein the received information comprises at least one of: (i) a Social Security number, (ii) a member identification number, (iii) a name, (iv) a date of birth, (v) an address, (vi) a telephone number, (vii) a student/local address, (viii) a student/local telephone number, (ix) a graduation date, (x) a status, (xi) a major, (xii) an electronic mail address, (xiii) a drivers license, (xiv) a passport number, (xv) citizenship information, (xvi) barcode information, (xvii) a parent name, (xviii) a parent address, (xix) image information, or (xx) an educational institution identifier.

4. The method of claim 1, further comprising wherein said validating includes:
reviewing the received information.

5. The method of claim 4, wherein said reviewing is performed via at least one of: (i) an operator, or (ii) and automated process.

6. The method of claim 1, wherein said financial transaction token comprises at least one of: (i) a card, (ii) an educational institution identification card, (iii) an automated teller machine card, (iv) a debit card, (v) a number), or (vi) a computing device.

7. The method of claim 1 further comprising:
arranging for the financial transaction token to be delivered to at least one of: (i) the educational institution or (ii) the student.

8. The method of claim 1, wherein the educational institution transaction is associated with at least one of: (i) tuition, (ii) financial assistance, (iii) a payroll transaction, (iv) a meal plan, (v) textbooks, or (vi) a campus purchase.

9. The method of claim 1, further comprising:
arranging for a transfer of payment with the educational institution in exchange for at least one of: (i) receiving the information, (ii) arranging for the bank account to be created, (iii) the balance of the bank account, or (iv) transactions processed via the bank account.

10. The method of claim 1, wherein information is received associated with a plurality of students.

11. The method of claim 1, wherein information is received associated with a plurality of educational institutions.

12. The method of claim 11, wherein said financial transaction token is adjusted based on a specific educational institution and said adjusting is associated with at least one or: (i) a Web site, (ii) marketing material, (iii) a card, (iv) text, (v) a color, (vi) a symbol, or (vii) a logo.

13. A medium storing instructions adapted to be executed by a processor to perform a method to facilitate a distribution of bank accounts to students from an educational institution, said method comprising:
receiving, from the educational institution, information associated with a student;
validating the received information;
determining that a soft bank account will be created based on the received information;
establishing the soft bank account for the student based on the received information, wherein the soft bank account is established prior to receiving any indication of acceptance from the student;
delivering a token associated with the student to the student;
distributing a disbursement from the educational institution to said soft bank account or to a pre-existing accessible bank account associated with the student;
receiving an indication of acceptance from the student that includes a request to convert the soft bank account to an accessible bank account; and
converting the soft bank account to an accessible bank account in response to the received indication of acceptance and providing said student with access to said disbursement via the token.

14. The method of claim 1 wherein said token is a financial transaction token.

15. The method of claim 14 wherein said indication of acceptance includes security information.

16. The method of claim 1 wherein said indication of acceptance includes security information.

* * * * *